Sept. 9, 1969  D. G. TRAVER  3,466,063

TRANSITION ELBOW

Filed Aug. 1, 1967

INVENTOR.
DARWIN G. TRAVER.

United States Patent Office 3,466,063
Patented Sept. 9, 1969

3,466,063
TRANSITION ELBOW
Darwin G. Traver, DeWitt, N.Y., assignor to Carrier Corporation, Syracuse, N.Y., a corporation of Delaware
Filed Aug. 1, 1967, Ser. No. 657,681
Int. Cl. F16l 43/00, 55/00, 35/00
U.S. Cl. 285—183                    1 Claim

ABSTRACT OF THE DISCLOSURE

A round to rectangular air duct elbow having minimal sound generation by air flow therethrough.

Background of the invention

In many air conditioning system wherein air is conditioned at a central location and delivered to a plurality of terminals in the areas to be conditioned, the main air ducts run under the floors of the areas being conditioned. To communicate these main ducts with the terminals therefor, branch ducts must be run up through the floor and, if it is desirable to connect to the terminal at one end thereof, the branch duct must have an elbow associated therewith. Further, the air connection at the terminal is often of a rectangular configuration while the branch duct is usually round for economic considerations. To complicate the matter even more, the duct work must be compact enough to fit within the terminal housing so that bare ductwork is not visible.

While transition elbows are available for this purpose, the noise generated by air flow therethrough is highly objectionable.

Summary of the invention

This invention relates to a transition elbow having a circular duct portion and a rectangular duct portion connected so as to form a duct elbow having low noise generating characteristics, the connecting portion between the top of the rectangular duct portion and the circular duct portion having a projection length on a plane perpendicular to the axis of the circular portion which is proportional to the diameter of the circular portion. The ratio of the diameter of the circular portion to the projected length of the connecting portion has a value of between 2.0 and 2.65.

Description of the preferred embodiment

Figure 1:
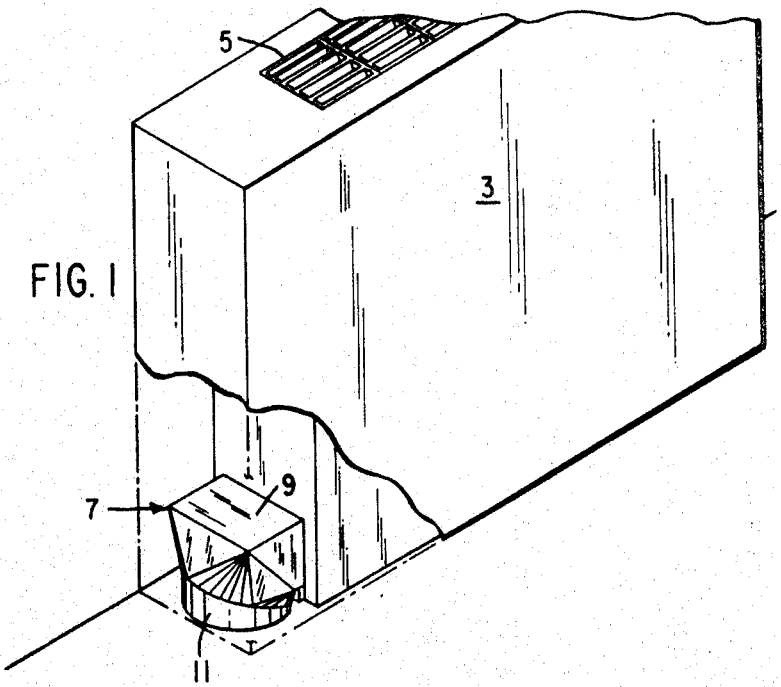
FIGURE 1 is a perspective view partially broken away, of an air conditioning room terminal utilizing the transition elbow duct of my invention.
Figure 2:
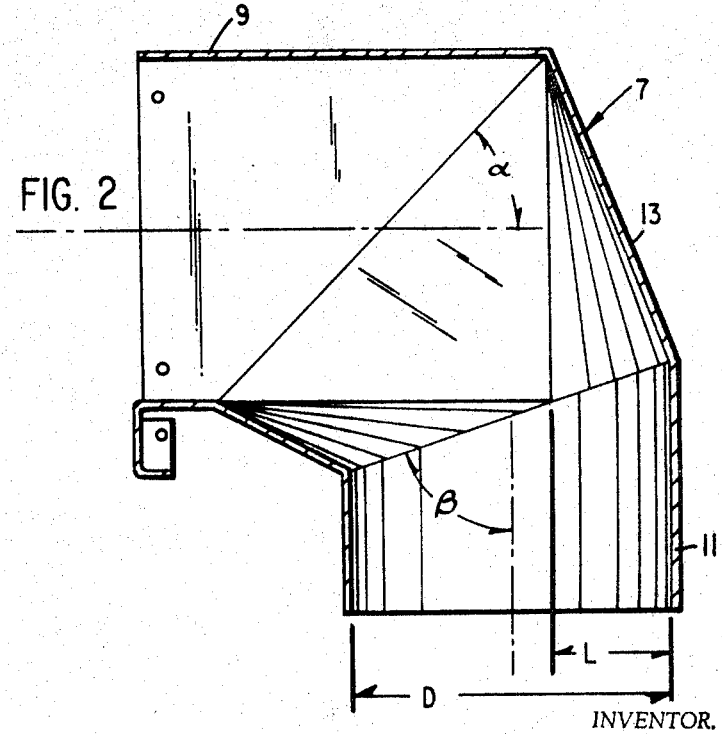
FIGURE 2 is a side elevational view of the transition elbow duct.

Referring to the drawings, there is illustrated a room terminal 3 adapted for connection to a source of conditioned air (not shown). A discharge grille 5 is provided for discharging the conditioned air from the terminal into the room. A transition elbow duct 7 is provided for connecting the terminal 3 to the supply ducts running beneath the floor of the area being conditioned. The transition duct 7 has a rectangular collar portion 9, one end of which is defined by a plane disposed at an angle α of between 40° and 50° with respect to the longitudinal axis of the rectangular portion. A cylindrical collar portion 11 defined on one end by a plane disposed at an angle β of between 60° and 80° with respect to the cylindrical axis of rotation is adapted for connection to the supply duct at the other end thereof. A third collar portion 13 forming a connection between the rectangular portion and the cylindrical portion locates the rectangular portion with respect to the cylindrical portion so as to provide an extremely quiet transitional elbow duct. The third collar portion connecting the top of the rectangular collar portion with the cylindrical collar portion has a projection length L on a plane perpendicular to the cylindrical axis of rotation and parallel to the rectangular longitudinal axis. While maintaining angles α and β within the limits disclosed above, the cylindrical and rectangular collars must be so located by the third collar portion as to result in the length L having a definite proportion to the diameter D of the cylindrical collar portion. The ratio of the diameter to the projection length must be maintained between 2.0 and 2.65 for this purpose.

Ordinary duct elbows which must subject the flow of air to a 90° turn while providing for transition from round to rectangular duct configuration in a confined area generate excessive unacceptacle noise which applicant's transition elbow duct eliminates even though it does not deviate excessively from the accepted configurations. A collar portion or section constructed in accordance with the criteria described and with a square and round portion configuration as described will provide a transition duct having greatly improved noise characteristics.

While I have described a preferred embodiment of the invention, it is to be understood the invention is not limited thereto but may be otherwise embodied.

I claim:

1. A transitional elbow comprising a cylindrical collar portion having a top edge defined by the intersection of the collar with a plane disposed at an angle of between 60° and 80° with respect to the axis of rotation of said cyindrical portion;

a rectangular collar portion having one edge defined by the intersection of the collar with a plane disposed at an angle of between 40° and 50° to the longitudinal axis of the rectangular collar, the longitudinal axis of said rectangular collar portion being perpendicular to the axis of rotation of said cylindrical portion;

a third collar portion, disposed between said cylindrical portion and said rectangular portion to form a continuous duct therewith, the ratio of the diameter of said cylindrical portion to the projection length, parallel to the longitudinal axis of said rectangular portion on a plane perpendicular to the axis of rotation of said cylindrical portion, of the third collar portion connecting the top edge of said rectangular portion and said cylindrical portion being between 2.0 and 2.65.

References Cited

UNITED STATES PATENTS

| 1,808,450 | 6/1931 | Burgess | 285—424 |
| 2,242,468 | 5/1941 | Holub | 285—183 |

OTHER REFERENCES

Adelta Mfg. Co., Inc. 21st and Ellsworth Sts., Philadelphia, Pa., catalog #55, page 14, item #923 cited.

Char-Gale Mfg. Co., Anoka, Minn., January 1957 catalog; page 23, item #660 and page 30, item #201 cited.

Standard Furnace Supply Co., P.O. Box 1312, Omaha, Nebr. Net Price Schedule dated 12-1-56, page 22, cold air shoe cited.

DAVID J. WILLIAMOWSKY, Primary Examiner

WAYNE L. SHEDD, Assistant Examiner

U.S. Cl. X.R.
165—49; 285—424